United States Patent
Kim et al.

(10) Patent No.: US 8,661,150 B2
(45) Date of Patent: Feb. 25, 2014

(54) METHOD, APPARATUS, AND SYSTEM PROVIDING MULTI-CONTENT IN MOBILE BROADCAST SERVICE

(75) Inventors: Hyun-Chul Kim, Suwon-si (KR);
Bo-Sun Jung, Seongnam-si (KR);
Young Jip Kim, Suwon-si (KR);
Byoung-Dai Lee, Seongnam-si (KR);
Young-Kyu Bae, Bucheon-si (KR);
Sun-Mi Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1053 days.

(21) Appl. No.: 12/195,822

(22) Filed: Aug. 21, 2008

(65) Prior Publication Data
US 2009/0054042 A1 Feb. 26, 2009

(30) Foreign Application Priority Data

Aug. 21, 2007 (KR) .................. 10-2007-0084220

(51) Int. Cl.
*G06F 15/16* (2006.01)
*G06F 3/00* (2006.01)

(52) U.S. Cl.
USPC .......................... 709/231; 725/44

(58) Field of Classification Search
USPC ................. 709/231; 725/39–55, 62
See application file for complete search history.

(56) References Cited

U.S. PATENT DOCUMENTS

| 6,604,240 | B2 * | 8/2003 | Ellis et al. ............. 725/45 |
| 6,772,434 | B1 * | 8/2004 | Godwin .................. 725/68 |
| 2003/0066078 | A1 | 4/2003 | Bjorgan et al. |
| 2006/0107282 | A1 * | 5/2006 | de Heer .................. 725/22 |
| 2007/0041377 | A1 * | 2/2007 | Song et al. ............. 370/389 |
| 2007/0110057 | A1 * | 5/2007 | Hwang et al. .......... 370/389 |
| 2007/0240189 | A1 * | 10/2007 | Paila ...................... 725/62 |
| 2007/0245382 | A1 * | 10/2007 | Doi et al. ............... 725/55 |

FOREIGN PATENT DOCUMENTS

| KR | 1020050010011 | 1/2005 |
| KR | 1020070032018 | 3/2007 |
| KR | 1020070049020 | 5/2007 |

* cited by examiner

*Primary Examiner* — Jeong S Park
(74) *Attorney, Agent, or Firm* — The Farrell Law Firm, P.C.

(57) ABSTRACT

Disclosed is a method and system for efficiently providing a multi-content, including a plurality of contents in one service, by means of a service guide upon providing the multi-content in an Open Mobile Alliance (OMA) mobile broadcasting system. When a broadcast transmitting apparatus provides a broadcast receiving apparatus with a multi-content by inserting a plurality of content into one service, the broadcast transmitting apparatus sets one of the plurality of content as a primary content, and provides a service guide including primary-content setting information to the broadcast receiving apparatus. The primary content represents a content set to be primarily provided to a user, among a plurality of content included in one service and simultaneously provided during a specific time period. The primary-content setting information represents information for identifying the primary content. The primary-content setting information may be included in a content fragment or schedule fragment of a service guide.

11 Claims, 9 Drawing Sheets

```xml
<xs:element name="Content" type="ContentType"/>
<xs:complexType name="ContentType">
    <xs:sequence>
        <xs:element name="ServiceReference" minOccurs="0" maxOccurs="unbounded">
            <xs:complexType>
                <xs:attribute name="idRef" type="xs:anyURI" use="required"/>
                <xs:attribute name="weight" type="xs:unsignedShort" use="optional" default="65535"/>
            </xs:complexType>
        </xs:element>
        <xs:element name="ProtectionKeyID" type="ProtectionKeyIDType" minOccurs="0" maxOccurs="unbounded"/>
        <xs:element name="PrimaryContent" type="PrimaryContentType" minOccurs="0"/>            ~301
        <!-- Start of program guide information -->
        <xs:element name="Name" type="LanguageString" maxOccurs="unbounded"/>
        <xs:element name="Description" type="LanguageString" minOccurs="0" maxOccurs="unbounded"/>
        <xs:element name="StartTime" type="xs:dateTime" minOccurs="0"/>
        <xs:element name="EndTime" type="xs:dateTime" minOccurs="0"/>
        <xs:element name="AudioLanguage" type="AudioOrTextLanguageType" minOccurs="0" maxOccurs="unbounded"/>
        <xs:element name="TextLanguage" type="AudioOrTextLanguageType" minOccurs="0" maxOccurs="unbounded"/>
        <xs:element name="Length" type="xs:duration" minOccurs="0"/>
        <xs:element name="ParentalRating" type="ParentalRatingType" minOccurs="0" maxOccurs="unbounded"/>
        <xs:element name="TargetUserProfile" type="TargetUserProfileType" minOccurs="0" maxOccurs="unbounded"/>
        <xs:element name="Genre" type="GenreType" minOccurs="0" maxOccurs="unbounded"/>
        <xs:element name="TermsOfUse" type="TermsOfUseType" minOccurs="0" maxOccurs="unbounded"/>
        <!-- End of program guide information -->
        <xs:element name="PreviewDataReference" type="PreviewDataReferenceType" minOccurs="0" maxOccurs="unbounded"/>
        <xs:element name="BroadcastArea" type="BroadcastAreaType" minOccurs="0"/>
        <xs:element name="PrivateExt" type="PrivateExtType" minOccurs="0"/>
    </xs:sequence>
    <xs:attribute name="id" type="xs:anyURI" use="required"/>
    <xs:attribute name="version" type="xs:unsignedInt" use="required"/>
    <xs:attribute name="validFrom" type="xs:unsignedInt" use="optional"/>
    <xs:attribute name="validTo" type="xs:unsignedInt" use="optional"/>
    <xs:attribute name="globalContentID" type="xs:anyURI" use="optional"/>
    <xs:attribute name="emergency" type="xs:boolean" use="optional" default="false"/>
    <xs:attribute name="serviceContentProtection" type="xs:boolean" use="optional" default="false"/>
    <xs:attribute name="baseCID" type="xs:string" use="optional"/>
</xs:complexType>
<xs:complexType name="PrimaryContentType">
    <xs:sequence>
        <xs:element name="PresentationWindowIDRef" type="xs:unsignedInt" minOccurs="0" maxOccurs="unbounded"/>         ~305
    </xs:sequence>
</xs:complexType>

<xs:complexType name="AudioOrTextLanguageType">
    <xs:simpleContent>
        <xs:extension base="LanguageString">
            <xs:attribute name="id" type="xs:anyURI" use="optional"/>
            <xs:attribute name="languageSDPTag" type="xs:string" use="required"/>
        </xs:extension>
    </xs:simpleContent>
</xs:complexType>
```

FIG.4

```xml
<xs:element name="Schedule" type="ScheduleType"/>
<xs:complexType name="ScheduleType">
    <xs:sequence>
        <xs:element name="ServiceReference">
            <xs:complexType>
                <xs:attribute name="idRef" type="xs:anyURI" use="required"/>
                <xs:attribute name="audioLanguageIDRef" type="xs:anyURI"
                    use="optional"/>
                <xs:attribute name="textLanguageIDRef" type="xs:anyURI"
                    use="optional"/>
            </xs:complexType>
        </xs:element>
        <xs:element name="InteractivityDataReference" minOccurs="0"
            maxOccurs="unbounded">
            <xs:complexType>
                <xs:sequence>
                    <xs:element name="AutoStart" type="xs:unsignedInt"
                        minOccurs="0" maxOccurs="unbounded"/>
                    <xs:element name="DistributionWindow"
                        type="DistributionWindowType" minOccurs="0"
                        maxOccurs="unbounded"/>
                </xs:sequence>
                <xs:attribute name="idRef" type="xs:anyURI" use="required"/>
            </xs:complexType>
        </xs:element>
        <xs:element name="ContentReference" minOccurs="0" maxOccurs="unbounded">
            <xs:complexType>
                <xs:sequence>
                    <xs:element name="AutoStart" type="xs:unsignedInt"
                        minOccurs="0" maxOccurs="unbounded"/>
                    <xs:element name="DistributionWindow"
                        type="DistributionWindowType" minOccurs="0"
                        maxOccurs="unbounded"/>
                    <xs:element name="PresentationWindow"
                        type="PresentationWindowType" minOccurs="0"
                        maxOccurs="unbounded"/>
                </xs:sequence>
                <xs:attribute name="idRef" type="xs:anyURI" use="required"/>
                <xs:attribute name="contentLocation" type="xs:anyURI"
                    use="optional"/>
                <xs:attribute name="audioLanguageIDRef" type="xs:anyURI"
                    use="optional"/>
                <xs:attribute name="textLanguageIDRef" type="xs:anyURI"
                    use="optional"/>
                <xs:attribute name="repeatPlayback" type="xs:boolean"
                    use="optional" default="false"/>
            </xs:complexType>
        </xs:element>
        <xs:element name="PreviewDataReference" type="PreviewDataReferenceType"
            minOccurs="0" maxOccurs="unbounded"/>
        <xs:element name="TermsOfUse" type="TermsOfUseType" minOccurs="0"
            maxOccurs="unbounded"/>
        <xs:element name="PrivateExt" type="PrivateExtType" minOccurs="0"/>
    </xs:sequence>
    <xs:attribute name="id" type="xs:anyURI" use="required"/>
    <xs:attribute name="version" type="xs:unsignedInt" use="required"/>
    <xs:attribute name="defaultSchedule" type="xs:boolean" use="optional" fixed="true"/>
    <xs:attribute name="onDemand" type="xs:boolean" use="optional" default="false"/>
    <xs:attribute name="validFrom" type="xs:unsignedInt" use="optional"/>
    <xs:attribute name="validTo" type="xs:unsignedInt" use="optional"/>
</xs:complexType>
<xs:complexType name="DistributionWindowType">
    <xs:attribute name="startTime" type="xs:unsignedInt" use="optional"/>
    <xs:attribute name="endTime" type="xs:unsignedInt" use="optional"/>
    <xs:attribute name="duration" type="xs:unsignedInt" use="optional"/>
    <xs:attribute name="id" type="xs:unsignedInt" use="optional"/>
</xs:complexType>
<xs:complexType name="PresentationWindowType">
    <xs:attribute name="startTime" type="xs:unsignedInt" use="optional"/>
    <xs:attribute name="endTime" type="xs:unsignedInt" use="optional"/>
    <xs:attribute name="duration" type="xs:unsignedInt" use="optional"/>
    <xs:attribute name="id" type="xs:unsignedInt" use="optional"/>
    <xs:attribute name="priorityToPlay" type="xs:boolean" use="optional"/>  ~401
</xs:complexType>
```

FIG. 7

METHOD, APPARATUS, AND SYSTEM PROVIDING MULTI-CONTENT IN MOBILE BROADCAST SERVICE

PRIORITY

This application claims priority to application entitled "METHOD, APPARATUS, AND SYSTEM FOR PROVIDING MULTI-CONTENT IN MOBILE BROADCAST SERVICE" filed with the Korean Intellectual Property Office on Aug. 21, 2007 and assigned Serial No. 2007-84220, the contents of which are incorporated herein by reference.

BACKGROUND OF THE INVENTION

1. Field of the Invention

The present invention relates to a method, apparatus, and system for providing a multi-content by conveying a plurality of content in one service in an Open Mobile Alliance (OMA) mobile broadcasting system, and more particularly to a method, apparatus, and system for efficiently providing a multi-content

2. Description of the Related Art

The mobile communication market constantly faces the need for the production of new services through the recombination or integration of existing technologies. Today, with the development of communication and broadcast technologies, the conventional broadcasting system or mobile communication system has reached the phase of providing broadcast services through portable terminals (i.e. mobile terminals), such as mobile phones, Personal Digital Assistants (PDAs), and the like. Convergence of mobile communication service and Internet Protocol (IP) technology is now the mainstream of the next generation mobile communication technology in harmony between the latent and actual market needs, the increasing user demand for multimedia services, the strategy of the service providers for providing new services like the broadcast service in addition to the existing voice service, and the interests of the Information Technology (IT) companies that are reinforcing their mobile communication business to meet user demands.

Open Mobile Alliance (OMA), which is a group involved in the standardization of the interworking between individual mobile technologies. The OMA mainly serves to define various application standards for mobile games, Internet services, etc. Of the working groups belonging to the OMA, the Open Mobile Alliance Mobile Broadcast (OMA BCAST) Sub-working Group is studying the technology for providing broadcast services using mobile terminals. A brief description will now be made of the mobile broadcasting system which is under discussion in the OMA.

First, in an OMA system, a mobile terminal to receive a mobile broadcast service should receive so-called service guide information, containing description information for the service, accounting information for the service, and information on a receiving method for the service. The mobile terminal receives the service according to the information provided through the service guide information. Since a part of service guide information may be changed at any time, a service guide about a specific service is repeatedly transmitted whenever a change is generated in the specific service. Also, due to the characteristics of mobile broadcasting, whenever a new mobile terminal enters the service area, a service guide about a mobile broadcast service is repeatedly transmitted, even if there is no change in the mobile broadcast service. That is, for example, when a new user to receive a mobile broadcast appears by powering on his/her mobile terminal, or when a mobile terminal to receive a new service guide enters the service area due to movement of the user, the new mobile terminal receives a separate service guide, regardless of a service guide which is provided to mobile terminals currently receiving mobile broadcasts.

FIG. 1 is a block diagram illustrating the configuration of a service guide used for receiving broadcast services in a general broadcasting system. This configuration is proposed to provide broadcast services to mobile terminals in the OMA BCAST system. One service guide is comprised of a plurality of groups, each of which has its own function, and all the groups are classified into four groups according to their functions, as shown in FIG. 1. FIG. 1 illustrates an exemplary service guide comprised of an administrative group 100, a provisioning group 110, a core group 120, and an access group 130.

The administrative group 100 is a group for providing basic information needed by a mobile terminal to receive a service guide, and includes a service guide context 101 and a service guide delivery descriptor 102. The service guide context 101 provides a service guide identifier (ID), identification information of the service provider that generates and transmits the service guide, and the entire information on the service guide. The service guide delivery descriptor 102 notifies a mobile terminal of a channel capable of receiving fragments for a plurality of service guides, scheduling information, and update information so that the mobile terminal may receive only the necessary service guide at an appropriate time.

The provisioning group 110 is a group for providing fee information for service reception, and includes a purchase item 111, a purchase data 112, and a purchase channel 113. The purchase item 111 provides fee information for a service or a service bundle, the purchase data 112 provides information indicating how a service user can pay the fee, and the purchase channel 113 provides information on the system where the service user can actually purchase the service.

The access group 130 includes an access 131 and a session description 132, and provides service access information indicating how to receive the services provided through the core group 120, and detailed information on a session in which contents constituting the corresponding service are transmitted, so as to enable the mobile terminal to access the corresponding service. The access 131 provides a plurality of access methods for one service to the mobile terminal, thereby providing a method capable of accessing various additional services based on one service. The session description 132 provides session information for the service defined in one access fragment. Also, as shown in FIG. 1, the service guide information can further include a preview data 124 that provides a preview and icon for the service and contents, in addition to the aforementioned four fragments.

The core group 120 is a group for providing information on the service itself, and includes a service 121, a schedule 122, and a content 123. The service 121 provides a description of the service itself that the user will receive, and also provides information indicating with which content the service can be configured. The schedule 122 provides information on the time at which the service can be provided and used. The content 123 provides information on a plurality of contents constituting the service.

The schedule 122 indicates schedule information for each content constituting each service. That is, the schedule 122 provides information on which content is available during a specific time period, among content included in one service.

In a mobile broadcast service, a plurality of content included in one service can simultaneously be available during a specific time period, an example of which is shown in FIG. 2. Referring to FIG. 2, a service 140 entitled "Music Channel" includes a plurality of content, which contains Music Top 20 141 provided on Jul. 10, 2007 from 10:00 to 11:00, and which contains Music news 142, Music news 143, Music Video #1 144, Music Video #2 145, and Music Video #3 146, provided on Jul. 10, 2007 from 11:00 to 12:00. The Music news 142 streams through a broadcasting network, the Music news 143, Music Video #1 144, and Music Video #2 145 stream through an interactive network, and the Music Video #3 146 is downloaded through the interactive network.

When a plurality of content are included in one service during the same time period, as described above, the user can select a desired content by one of two methods. A first method is for the user to directly select a desired content as well as the service, thereby receiving the desired content. According to the first method, since the user expressly selects the content, the first method can be implemented without any problem. A second method is for the user not to directly select the content, but to select only an upper service containing a plurality of content, thereby receiving a service. According to the second method, since the user selects only an upper service containing a plurality of content, and his/her terminal selects and receives the content from among the plurality of content contained in the service, the second method has a problem in that there is no consistency. That is, since the terminal cannot recognize which content has a higher priority among the plurality of content contained in one service, the terminal randomly selects and begins to receive the content, wherein criteria for selecting the content may differ depending on terminals, so that the user may be confused. Also, although a broadcasting station configures one service with a plurality of content, and desires to set a specific content among the content as a primary content, there is no method for setting a specific content among a plurality of content as a primary content in the current mobile broadcasting standard.

SUMMARY OF THE INVENTION

Accordingly, the present invention has been made to solve at least the above-mentioned problems occurring in the prior art, and the present invention provides a method, apparatus, and system for setting a specific content as a primary content when one service contains a plurality of content during the same time period in a mobile broadcast service.

In addition, the present invention provides a method, apparatus, and system for efficiently providing multi-content in a mobile broadcast service.

In accordance with an aspect of the present invention, there is provided a method for providing a multi-content in a mobile broadcast service, the method includes transmitting, by a broadcast transmitting apparatus, primary-content setting information through a service guide by inserting the primary-content setting information into the service guide when a certain content among a plurality of content, which are included in one service and are simultaneously transmitted during a specific time period, is selected as a primary content, the primary-content setting information representing that the certain content corresponds to the primary content during the specific time period; and detecting, by a broadcast receiving apparatus, the primary-content setting information from the service guide when the broadcast receiving apparatus receives the service guide and receives an output request for said one service during the specific time period, identifying the certain content set as the primary content, and receiving and executing the certain content among the plurality of content currently transmitted from the broadcast transmitting apparatus.

BRIEF DESCRIPTION OF THE DRAWINGS

The above and other aspects, features and advantages of the present invention will be more apparent from the following detailed description taken in conjunction with the accompanying drawings, in which:

FIG. 4 is a diagram illustrating an extensive Markup Language (XML) scheme of a content fragment according to an exemplary embodiment of the present invention;

FIG. 7 is a diagram illustrating an XML scheme of a schedule fragment according to another exemplary embodiment of the present invention;

DETAILED DESCRIPTION OF THE EXEMPLARY EMBODIMENT

Figure 1:
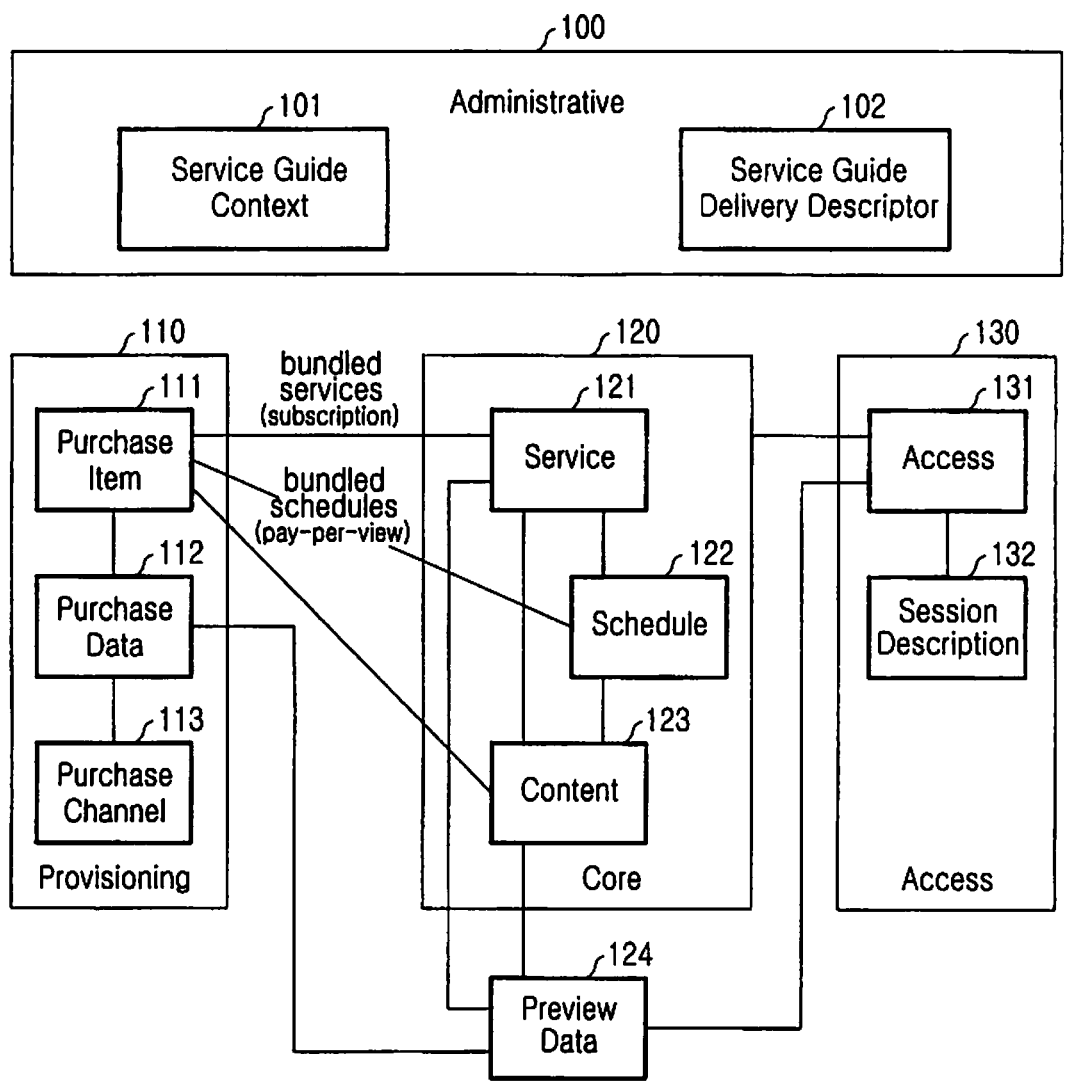
FIG. 1 is a block diagram illustrating the configuration of a service guide used for receiving broadcast services in a general broadcasting system.
Figure 2:
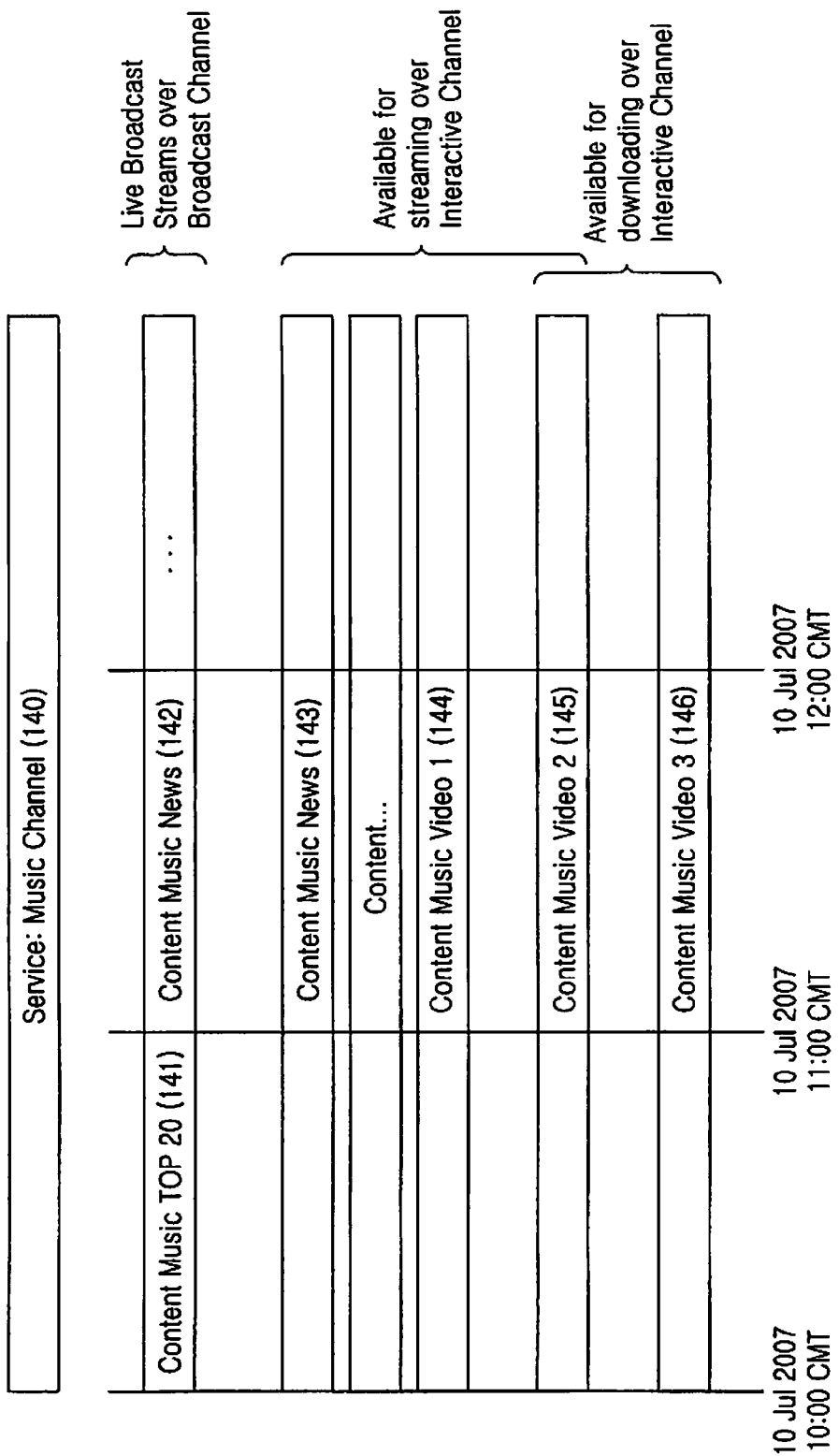
FIG. 2 is a diagram illustrating a multi-content in which a plurality of contents are included in one service.

Hereinafter, exemplary embodiments of the present invention will be described with reference to the accompanying drawings. It should be noted that in the following description, the same elements will be designated by the same reference numerals even though they are shown in different drawings. In addition, in the following description of the present invention, a detailed description of known functions and configurations incorporated herein will be omitted for clarity and conciseness.

The present invention provides a method for providing a multi-content in a mobile broadcast service. The invention transmits, by a broadcast transmitting apparatus, primary-content setting information through a service guide by inserting the primary-content setting information into the service guide when a certain content among a plurality of contents, which are included in one service and are simultaneously transmitted during a specific time period, is selected as a primary content, the primary-content setting information representing that the certain content corresponds to the primary content during the specific time period then the invention detects, by a broadcast receiving apparatus, the primary-content setting information from the service guide when the broadcast receiving apparatus receives the service guide and receives an output request for said one service during the specific time period, identifying the certain content set as the primary content, and receives and executes the certain content among the plurality of contents currently transmitted from the broadcast transmitting apparatus.

Also, during the transmission the broadcast transmitting apparatus specifies the certain content among the plurality of contents as the primary content by a service provider, inserts the primary-content setting information into a content fragment corresponding to the certain content, and generates and transmitting the service guide which includes the content fragment.

The primary-content setting information includes identification information for identifying the primary content, and time information representing a time period during which the certain content is set as the primary content.

During the insertion of the primary-content setting information into a content fragment corresponding to the certain content, a PrimaryContent element and a PresentationWindowIDRef element are inserted into an XML scheme of the content fragment, the PrimaryContent element enables the primary content to be identified, the PresentationWindowIDRef element is a lower element of the PrimaryContent element and represents a time period during which the certain content functions as the primary content.

During the execution of the certain content by the broadcast receiving apparatus the service guide is received, a content which is available at a current time, from among contents connected with said one service by making reference to the service guide, is searchable for when receiving an output request for said one service during the specific time period, content fragment corresponding to each available content is analyzed when the available content is plural in number, and a content corresponding to a content fragment, which includes the PrimaryContent element and which includes a PresentationWindowIDRef element of the PrimaryContent element appointing a time period equal to the specific time period is identified and the identified content among the plurality of contents currently transmitted from the broadcast transmitting apparatus is received and executed.

During the transmission by the broadcast transmitting apparatus includes the steps of: certain content among the plurality of contents as the primary content by a service provider is specified the primary-content setting information is inserted into a schedule fragment corresponding to the certain content, and the service guide which includes the schedule fragment is generated and transmitted.

The primary-content setting information includes time information representing a time period during which the certain content is set as the primary content.

During the insertion of the primary-content setting information into a schedule fragment corresponding to the certain content, a prioritytoPlay attribute is added to a PresentationWindow element of a ContentReference in an XML schema of the schedule fragment so that the primary content can be identified, and the prioritytoPlay attribute is set to true.

During the execution of the certain content by the broadcast receiving apparatus the service guide is received a content which is available at a current time is searchable for, from among contents connected with said one service by making reference to the service guide, when receiving an output request for said one service during the specific time period, a schedule fragment corresponding to each available content is analyzed when the available content is plural in number, and a content corresponding to a schedule fragment, the prioritytoPlay attribute of which is set to true is identified, and the identified content among the plurality of contents currently transmitted from the broadcast transmitting apparatus is received and executed.

According to the present invention, when a mobile broadcast transmitting apparatus provides a multi-content, including a plurality of content in one service, to a broadcast receiving apparatus, the mobile broadcast transmitting apparatus sets one of the content as a primary content, and transmits primary-content setting information to the broadcast receiving apparatus by inserting the primary-content setting information into a service guide to be transmitted. The primary content represents a content set to be primarily provided to a user, among a plurality of content included in one service and simultaneously provided during a specific time period. The primary-content setting information represents information for identifying the primary content. According to an exemplary embodiment of the present invention, the primary-content setting information may be included in a content fragment or schedule fragment of a service guide. The exemplary embodiments of the present invention will now be described with reference to FIGS. 3 to 9.

Figure 3:
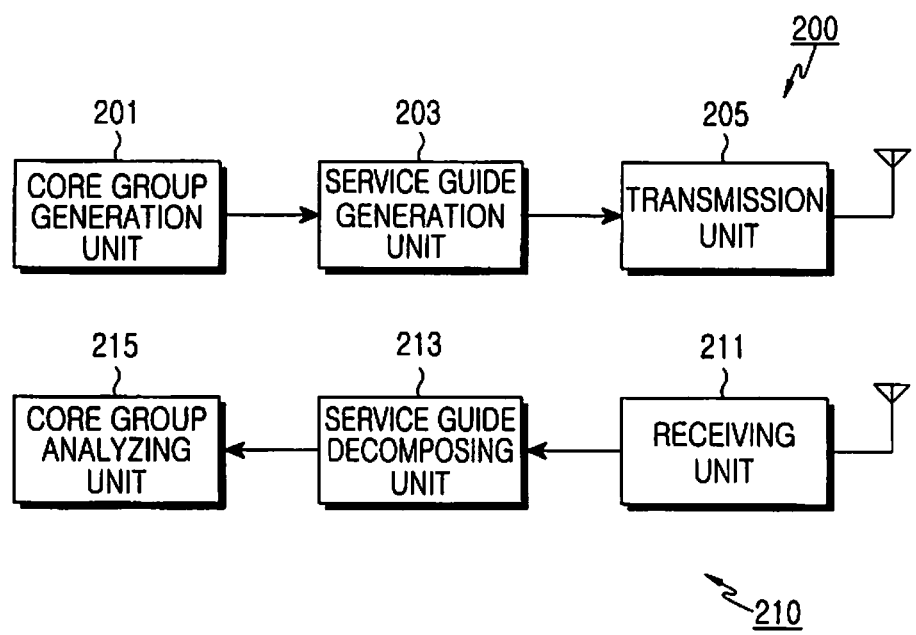
FIG. 3 is a block diagram illustrating the configuration of a mobile broadcasting system according to an exemplary embodiment of the present invention.

FIG. 3 is a block diagram illustrating the configuration of a mobile broadcasting system, to which the present invention is applied. The mobile broadcasting system includes a broadcast transmitting apparatus 200 and a broadcast receiving apparatus 210. The broadcast transmitting apparatus 200 broadcasts or transmits a mobile broadcast to the broadcast receiving apparatus 210 via a transmission network. The transmission network may be a network providing broadcast channels, or a network providing duplex channels. The broadcast receiving apparatus 210 may be a mobile terminal, such as a cellular phone, a personal digital assistant (PDA), etc.

The broadcast transmitting apparatus 200 includes a core group generation unit 201, a service guide generation unit 203, and a transmission unit 205. The core group generation unit 201 generates and outputs a core group for a service guide, which includes information about the service itself, to the service guide generation unit 203. To this end, the core group generation unit 201 generates a service fragment, a schedule fragment, and a content fragment. Particularly, according to an exemplary embodiment of the present invention, the core group generation unit 201 inserts primary-content setting information, which is used to identify a certain content set as a primary content by a service provider, among a plurality of content included in one service, into the content fragment or the schedule fragment. The service guide generation unit 203 generates service guide information by using a core group output from the core group generation unit 201, and the transmission unit 205 transmits the service guide information to the broadcast receiving apparatus 210 through a transmission network. The broadcast receiving apparatus 210 includes a receiving unit 211, a service guide decomposing unit 213, and a core group analyzing unit 215. The receiving unit 211 receives a service guide transmitted from the broadcast transmitting apparatus 200 through a transmission network, and outputs the service guide to the service guide decomposing unit 213. The service guide decomposing unit 213 decomposes the received service guide into groups, and transfers the groups to corresponding group analyzing units. FIG. 3 shows one core group analyzing unit 215, among a plurality of group analyzing units. The core group analyzing unit 215 analyzes a fragment included in the core group, which has been input from the service guide decomposing unit 213. When the user requests a random service to be output, the core group analyzing unit 215 analyzes a currently received content fragment or schedule fragment connected with the random service, detects the primary-content setting information, and identifies a content set as a primary content among a plurality of content included in the service, thereby reproducing the corresponding content.

A procedure of transmitting primary-content setting information through a content fragment by inserting the primary-content setting information into the content fragment will be described with reference to FIGS. 4 to 6, and then a procedure of transmitting primary-content setting information through a schedule fragment by inserting the primary-content setting information into the schedule fragment will be described with reference to FIGS. 7 to 9.

When a certain content among a plurality of content, which are included in one service and are simultaneously transmitted during a specific time period, is selected as a primary content by a broadcasting provider, the broadcast transmitting apparatus 200 inserts primary-content setting information into a content fragment corresponding to the certain content. In this case, the primary-content setting information includes identification information for identifying the certain content, and time information indicating a time period during which the certain content is set as a primary content. To this end, a PrimaryContent element for distinguishing a primary content from the other contents is added to the XML scheme of the content fragment. The PrimaryContent element has a PresentationWindowIDRef element, representing a time period during which a corresponding content functions as a primary content, as a lower element thereof. Content transmission time information included in a content fragment in a mobile broadcast service may be expressed by an ID allocated according to each time period, instead of being expressed by an actual time period. Only one primary content among a plurality of content included in one service is available during one time period. An example of an XML schema of a content fragment according to the aforementioned description is shown in FIG. 4. Referring to FIG. 4, the PrimaryContent element and the PresentationWindowIDRef element may be added to an XML scheme of a content fragment, as indicated by reference numerals 301 and 305.

Figure 5:
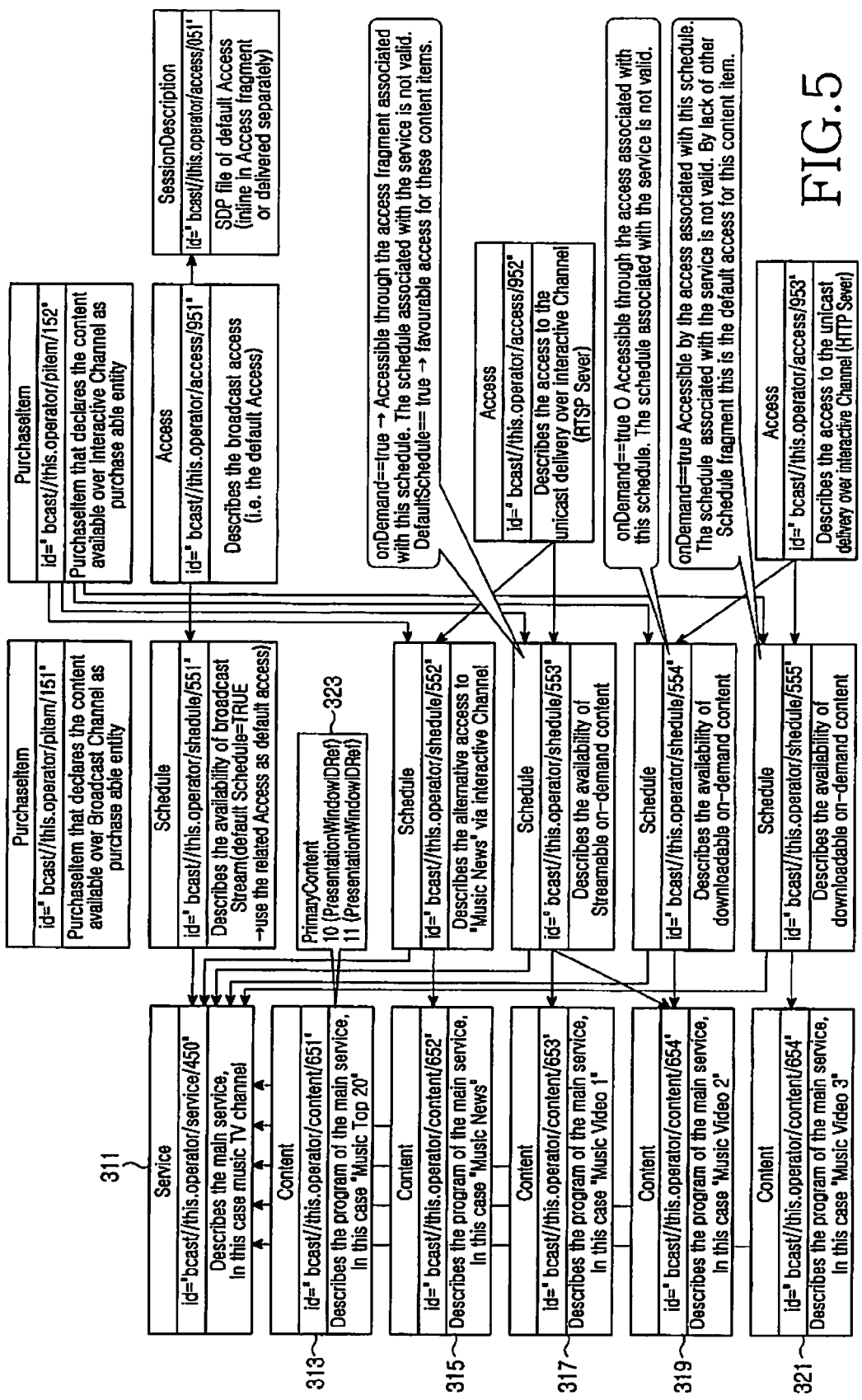
FIG. 5 is a diagram illustrating the configuration of a service guide according to an exemplary embodiment of the present invention.
Figure 6:
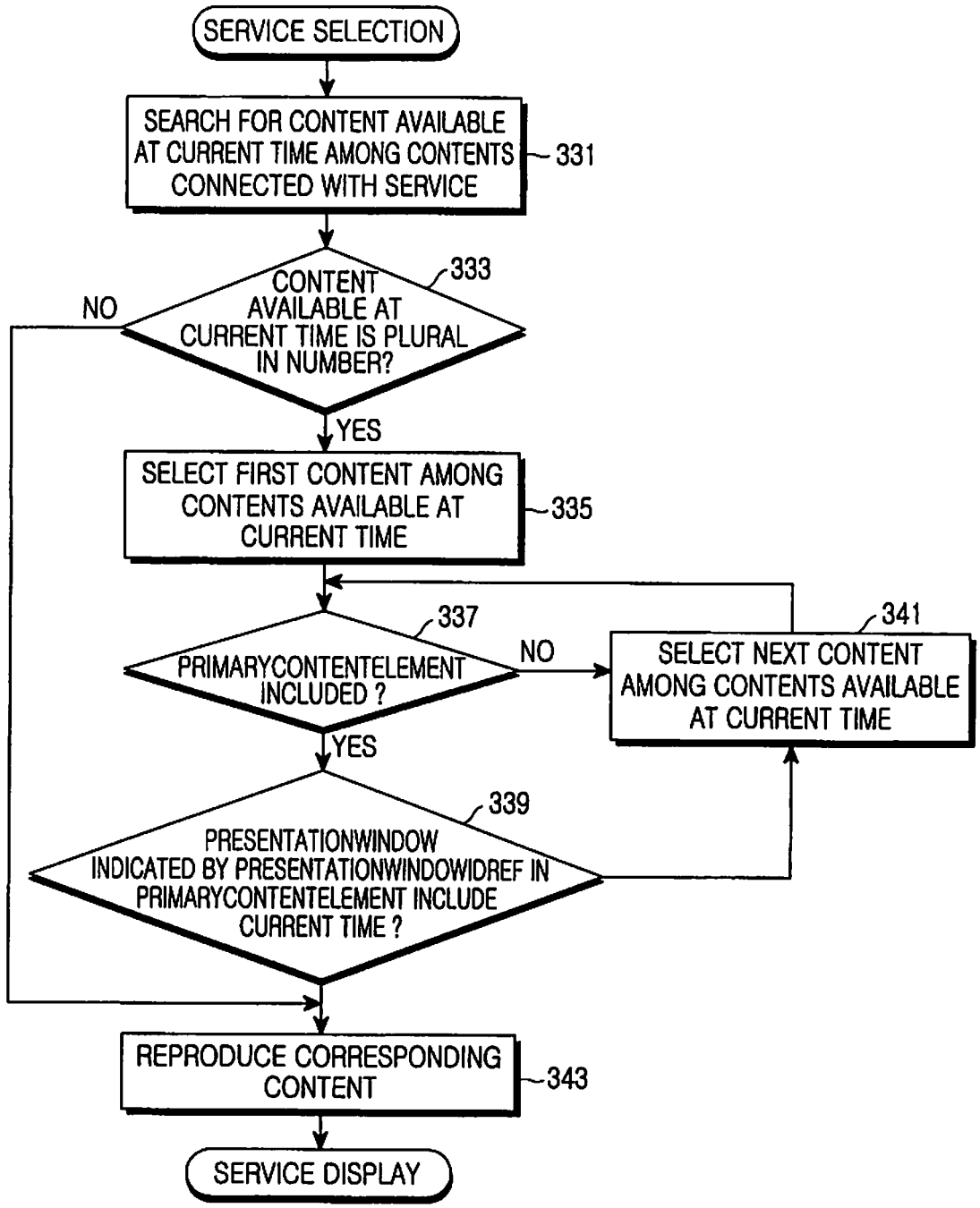
FIG. 6 is a flowchart illustrating the operation of a broadcast receiving apparatus according to an exemplary embodiment of the present invention.

FIG. 5 is a view illustrating the configuration of a service guide when a "bcast//this.operator/content/651" content among a plurality of content included in a "bcast//this.operator/service/450" service is set as a primary content. Since it is impossible to identify which content of a plurality of content 313, 315, 317, 319 and 321 included in a "bcast//this.operator/service/450" service 311 corresponds to a primary content in the prior art, a broadcast receiving apparatus has no other way than to select a random content to receive a service when the user selects the service. In contrast, according to the present invention, it is possible to set the "bcast//this.operator/content/651" content 313 as a primary content by using the PrimaryContent element and the PresentationWindowIDRef element. That is, the "bcast//this.operator/content/651" content 313 is represented as a primary content, distinguished from the other content, by using the PrimaryContent element in the content fragment, and a Presentation Window ID corresponding to a time period during which the "bcast//this.operator/content/651" content 313 is set as the primary content is appointed by using the PresentationWindowIDRef element, which is a lower element of the PrimaryContent element. A time period during which the "bcast//this.operator/content/651" content 313 is set as the primary content according to the embodiment of FIG. 5 is shown in Table 1.

TABLE 1

Current Time: Jul. 10, 2007, 10:25 (GMT)
Presentation Window: Jul. 10, 2007, 10:00~10:30 (Presentation Window id = 10
Presentation Window: Jul. 10, 2007, 10:30~11:00 (Presentation Window id = 11

The content fragment configured as described above is inserted into a service guide and is then transmitted to the broadcast receiving apparatus 210. The broadcast receiving apparatus 210 operates as shown in FIG. 6. Referring to FIG. 6, when the user selects a random service among a plurality of services provided by a mobile broadcast service, in step 331 the broadcast receiving apparatus 210 searches for one or more content which are available at the current time among content provided in the service in step 331. In step 333, the broadcast receiving apparatus 210 determines if a plurality of content are available at the current time. If a plurality of content are available at the current time, the broadcast receiving apparatus 210 proceeds to step 335, but if only one content is available at the current time, the broadcast receiving apparatus 210 proceeds to step 343, where the broadcast receiving apparatus 210 reproduces the corresponding content. In step 335, the broadcast receiving apparatus 210 selects a first content among the content available in the current time, and then proceeds to step 337. In step 337, the broadcast receiving apparatus 210 determines if a content fragment connected with the selected content includes a PrimaryContent element. If the content fragment connected with the selected content includes a PrimaryContent element, the broadcast receiving apparatus 210 proceeds to step 339, but if not, then the broadcast receiving apparatus 210 proceeds to step 341. In step 341, the broadcast receiving apparatus 210 selects a next content among the contents available at the current time, and then again performs step 337. In step 339, the broadcast receiving apparatus 210 determines if a PresentationWindow indicated by a PresentationWindowIDRef element in the PrimaryContent element includes the current time. If the PresentationWindow indicated by the PresentationWindowIDRef element includes the current time, it means that the currently selected content is a primary content at the current time, but if the PresentationWindow does not include the current time, it means that the currently selected content is not a primary content at the current time. Accordingly, when the PresentationWindow includes the current time, the broadcast receiving apparatus 210 proceeds to step 343, where the broadcast receiving apparatus 210 reproduces the corresponding content. In contrast, when the PresentationWindow does not include the current time, the broadcast receiving apparatus 210 proceeds to step 341, where the broadcast receiving apparatus 210 checks a content fragment of a next available content. In other words, when the broadcast receiving apparatus 210 has identified a primary content, the broadcast receiving apparatus 210 receives and reproduces a content corresponding to the primary content, among a plurality of content currently transmitted from the broadcast transmitting apparatus 200.

The operation of the broadcast receiving apparatus 210 will now be described with reference to the example shown in FIG. 5. When the user selects the "bcast//this.operator/service/450" service 311, the broadcast receiving apparatus 210 searches for one or more content available at the current time among content belonging to the "bcast//this.operator/service/450" service 311 by making reference to a service guide. The content available at the current time include the "bcast//this.operator/content/651" content 313, the "bcast//this.operator/content/652" content 315, the "bcast//this.operator/content/653" content 317, the "bcast//this.operator/content/654" content 319, and the "bcast//this.operator/content/655" content 321. When there are a plurality of content available at the current time, as described above, the broadcast receiving apparatus 210 analyzes a fragment corresponding to each content, searches for a content having a PrimaryContent element, and determines if a corresponding content is a primary content at the current time by using the value of a PresentationWindowIDRef of the PrimaryContent element. In FIG. 5, since there is a content which has a PrimaryContent element and has a PresentationWindowIDRef indicating a time period including the current time is the "bcast//this.operator/content/651" content 313, the broadcast receiving apparatus 210 executes the "bcast//this.operator/content/651" content 313, wherein the PresentationWindowIDRef is a lower element of the PrimaryContent element. In order to execute the "bcast//this.operator/content/651" content 313, the broadcast receiving apparatus 210 searches for an access fragment connected with the corresponding content. In the case of FIG. 5, since there in no access fragment directly connected with the "bcast//this.operator/content/651" content 313, a "bcast//this.operator/access/951" access fragment connected with the "bcast//this.operator/service/450" service 311 to which the "bcast//this.operator/content/651" content 313 belongs is used.

Hereinafter, a procedure of transmitting primary-content setting information through a schedule fragment by inserting the primary-content setting information into the schedule fragment will be described with reference to FIGS. 7 to 9.

According to an exemplary embodiment of the present invention, when a certain content among a plurality of content, which are included in one service and are simultaneously transmitted during a specific time period, is selected as a primary content by a broadcasting provider, the broadcast transmitting apparatus 200 inserts primary-content setting information into a service fragment corresponding to the certain content. To this end, according to the present invention, an attribute called "prioritytoPlay" is added to a PresentationWindow element of a ContentReference in XML schema of a schedule fragment so that a primary content can be distinguished from the other content. That is, when the "prioritytoPlay" attribute of a PresentationWindow element of a ContentReference included in a schedule fragment is set to true, a content included within a time period indicated by the startTime and endTime of the PresentationWindow corresponds to a primary content indicated by the ContentReference. An example of an XML scheme of a service fragment according to the aforementioned description is shown in FIG. 7. Referring to FIG. 7, the "prioritytoPlay" attribute may be added to an XML scheme of a schedule fragment, as indicated by reference numerals 401.

Figure 8:
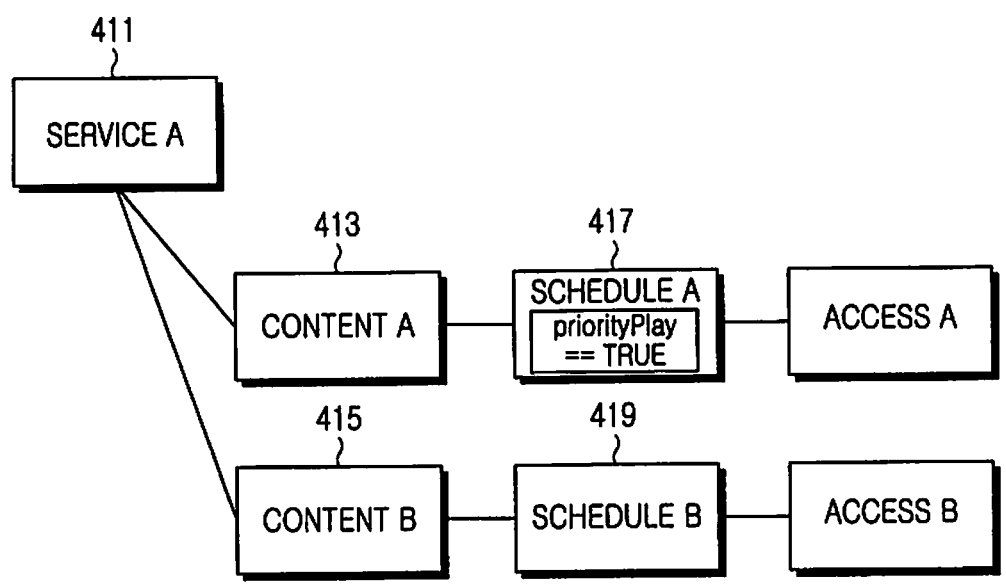
FIG. 8 is a diagram illustrating the configuration of a service guide according to another exemplary embodiment of the present invention.
Figure 9:
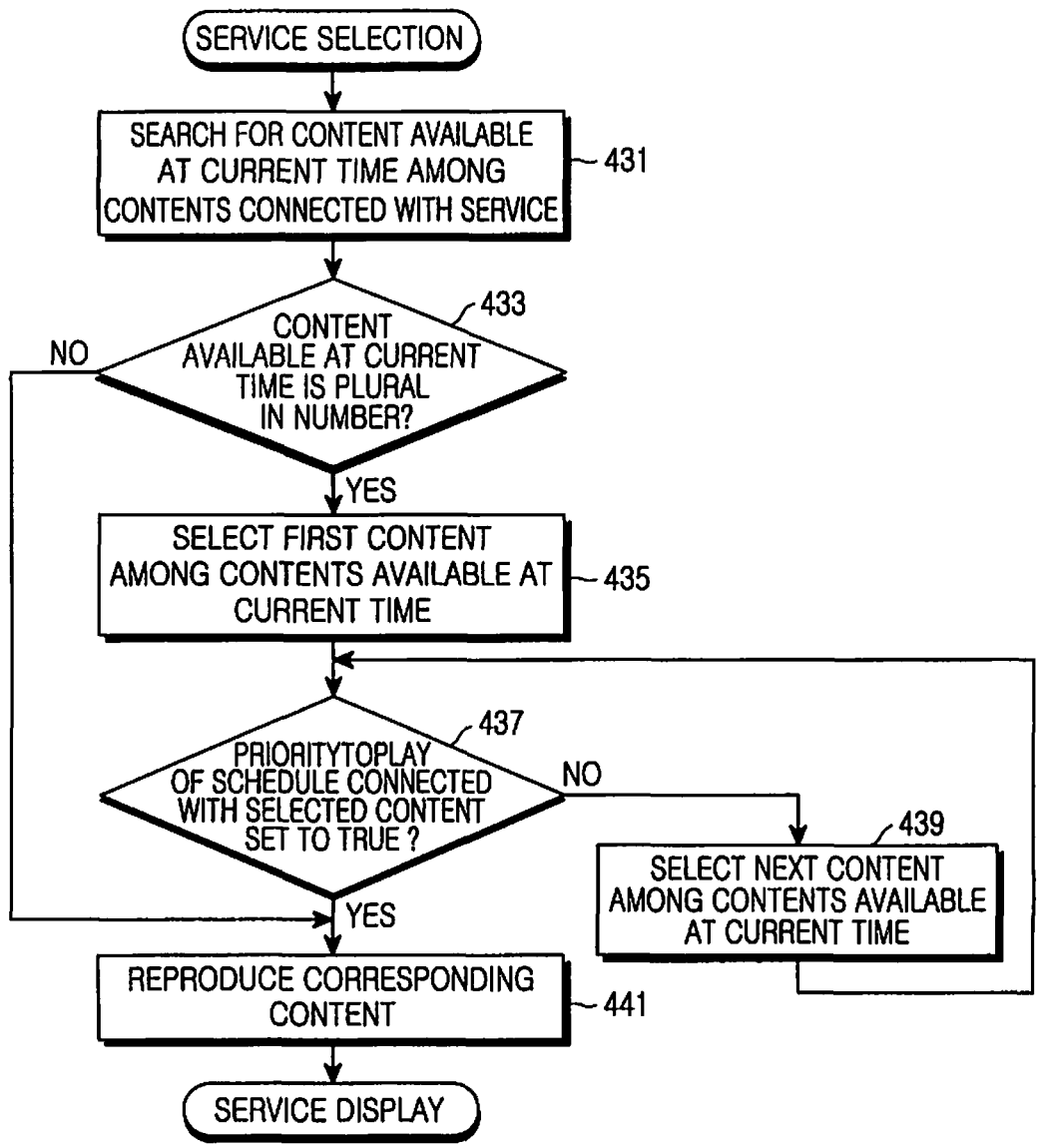
FIG. 9 is a flowchart illustrating the operation of a broadcast receiving apparatus according to another exemplary embodiment of the present invention.

FIG. 8 is a block diagram illustrating the structure of a service guide when the "prioritytoPlay" attribute is added to a schedule fragment according to an exemplary embodiment of the present invention. Service-A fragment 411 includes two contents, i.e. content A 413 and content B 415. The content 413 and 415 are connected with schedule A 417 and schedule B 419, respectively. When the times of Presentation Windows defined in schedule A 417 and schedule B 419 are the same, content A 413 and content B 415 belonging to service A 411 can be received during the same time period by the broadcast receiving apparatus 210. In contrast, when the prioritytoPlay attribute is set to true in schedule A 417, as shown in FIG. 8, content A 413 has a relatively higher priority than content B 415, so that the user is provided with content A 413 when selecting service A 411.

The operation of the broadcast receiving apparatus 210 will now be described with reference to FIG. 9. As shown in FIG. 9, when the user selects a random service among a plurality of services provided by a mobile broadcast service, the broadcast receiving apparatus 210 searches for one or more content which are available at the current time among content provided in the service in step 431. In step 433, the broadcast receiving apparatus 210 determines if a plurality of content are available at the current time. If a plurality of content are available at the current time, the broadcast receiving apparatus 210 proceeds to step 435, but if only one content is available at the current time, the broadcast receiving apparatus 210 proceeds to step 443, where the broadcast receiving apparatus 210 reproduces the corresponding content. In step 435, the broadcast receiving apparatus 210 selects a first content among the content available in the current time, and then proceeds to step 437. In step 437, the broadcast receiving apparatus 210 determines if the prioritytoPlay attribute of a schedule fragment connected with the selected content is set to true. When the prioritytoPlay attribute is not set to true as a result of the determination, the broadcast receiving apparatus 210 proceeds to step 439, where the broadcast receiving apparatus 210 selects a next content among the contents available at the current time, and again performs step 437. In contrast, when the prioritytoPlay attribute is set to true, the broadcast receiving apparatus 210 proceeds to step 441, where the broadcast receiving apparatus 210 reproduces the corresponding content. That is, when the broadcast receiving apparatus 210 has identified a primary content, the broadcast receiving apparatus 210 receives and reproduces a content corresponding to the primary content, among a plurality of contents currently transmitted from the broadcast transmitting apparatus 200.

As described above, according to the present invention, when a multi-content, including a plurality of content in one service during the same time period, is provided in a mobile broadcast service, the concept of a primary content where one content has a relatively higher priority than the other content is used, so that selection and configuration of content can be efficiently performed. Also, by clearly defining the concept of the primary content, it is possible to transfer various content configurations to the users according to the intention of the content provider. In addition, it is possible to provide a standard method of selecting and reproducing one content among a plurality of contents received during the same time period when a broadcast receiving apparatus receives a multi-content.

According to the present invention, when one service includes a plurality of content during the same time period in a mobile broadcast service, a specific content is set to a primary content, so that it is possible to efficiently provide a multi-content in a mobile broadcast service.

While the present invention has been shown and described with reference to certain exemplary embodiments thereof, it will be understood by those skilled in the art that various changes in form and details may be made therein without departing from the spirit and scope of the invention as defined by the appended claims. For example, although the embodiments of the present invention have been described about a case where primary-content setting information is inserted into a content fragment and a case where primary-content setting information is inserted into a schedule fragment, respectively, the present invention may be implemented in such a manner as to insert primary-content setting information into both the content fragment and the schedule fragment. Also, although the service guide generation unit and the core group generation unit have been described as separate function units, the present invention may be implemented with a configuration in which the core group generation unit is included in the service guide generation unit. In addition, the present invention may be implemented with a configuration in which the core group analyzing unit is included in the service guide decomposing unit. Accordingly, the scope of the invention is not to be limited by the above embodiments but by the claims and the equivalents thereof.

What is claimed is:

1. A method for providing a multi-content in a mobile broadcast service, the method comprising the steps of:
   transmitting, by a broadcast transmitting apparatus, primary-content setting information through a service guide by inserting the primary-content setting information into the service guide when a certain content among a plurality of content, which are included in one service and are simultaneously transmitted during a specific time period, is selected as a primary content, the primary-content setting information representing that the certain content corresponds to the primary content during the specific time period; and
   detecting, by a broadcast receiving apparatus, the primary-content setting information from the service guide when the broadcast receiving apparatus receives the service guide and receives an output request for said one service during the specific time period, identifying the certain content set as the primary content without selecting the certain content by a user, and receiving and executing, without selecting the certain content by the user, the certain content among the plurality of content currently transmitted from the broadcast transmitting apparatus,
   wherein the transmitting step by the broadcast transmitting apparatus comprises:
   specifying by a service provider the certain content among the plurality of content as the primary content;
   inserting the primary-content setting information into a content fragment corresponding to the certain content; and
   generating and transmitting the service guide which includes the content fragment.

2. The method as claimed in claim 1, wherein the primary-content setting information includes identification information for identifying the primary content, and time information representing a time period during which the certain content is set as the primary content.

3. The method as claimed in claim 2, wherein, in the step of inserting the primary-content setting information into a content fragment corresponding to the certain content, a PrimaryContent element and a PresentationWindowIDRef element are inserted into an eXtensible Markup Language (XML) scheme of the content fragment, the PrimaryContent element enabling the primary content to be identified, the PresentationWindowIDRef element being a lower element of the PrimaryContent element and representing a time period during which the certain content functions as the primary content.

4. The method as claimed in claim 3, wherein the step of executing the certain content by the broadcast receiving apparatus comprises:
   receiving the service guide;
   searching for a content which is available at a current time, from among content connected with said one service by referring to the service guide, when receiving an output request for said one service during the specific time period;
   analyzing a content fragment corresponding to each available content when more than one content is available, and identifying a content corresponding to a content fragment, which includes the PrimaryContent element and which includes a PresentationWindowIDRef element of the PrimaryContent element appointing a time period equal to the specific time period; and
   receiving and executing the identified content among the plurality of content currently transmitted from the broadcast transmitting apparatus.

5. A system for providing a multi-content in a mobile broadcast service, the system comprising:
   a broadcast transmitting apparatus for transmitting primary-content setting information through a service guide by inserting the primary-content setting information into the service guide when a certain content among a plurality of content, which are included in one service and are simultaneously transmitted during a specific time period, is selected as a primary content, the primary-content setting information representing that the certain content corresponds to the primary content during the specific time period; and
   a broadcast receiving apparatus for detecting the primary-content setting information from the service guide when the broadcast receiving apparatus receives the service guide and receives an output request for said one service during the specific time period, identifying the certain content set as the primary content without selecting the certain content by a user, and receiving and executing, without selecting the certain content by the user, the certain content among the plurality of content currently transmitted from the broadcast transmitting apparatus,
   wherein the broadcast transmitting apparatus receives a selection of the certain content among the plurality of content as the primary content from a service provider, inserts the primary-content setting information into a content fragment corresponding to the certain content, and generates and transmits the service guide which includes the content fragment.

6. The system as claimed in claim 5, wherein the primary-content setting information includes identification information for identifying the primary content, and time information representing a time period during which the certain content is set as the primary content.

7. The system as claimed in claim 6, wherein an eXtensive Markup Language (XML) scheme of the content fragment comprises a PrimaryContent element and a PresentationWindowIDRef element, the PrimaryContent element enabling the primary content to be identified, the PresentationWindowIDRef element being a lower element of the PrimaryContent element and representing a time period during which the certain content functions as the primary content.

8. The system as claimed in claim 7, wherein the broadcast receiving apparatus receives the service guide, searches for a content which is available at a current time, from among content connected with said one service by referring to the service guide, when receiving an output request for said one service during the specific time period, analyzes a content fragment corresponding to each available content when more than one content is available, and identifies, as the primary content, a content corresponding to a content fragment, which includes the PrimaryContent element and which includes a PresentationWindowIDRef element of the PrimaryContent element appointing a time period equal to the specific time period.

9. A broadcast receiving apparatus for providing a multi-content in a mobile broadcast service, the broadcast receiving apparatus comprising:
   a receiving unit for receiving a service guide and a broadcast service from a broadcast transmitting apparatus; and
   a service guide decomposing unit for detecting primary-content setting information corresponding to a random service from the service guide when receiving an output request for the random service among a plurality of services transmitted from the broadcast transmitting apparatus, identifying, without selecting a certain content by a user, a certain content set as the primary content among a plurality of content, which are included in the random service and are set to be transmitted from the broadcast transmitting apparatus at a current time, and receiving and executing, without selecting the certain content by the user, the certain content among the plurality of content currently transmitted from the broadcast transmitting apparatus, wherein the primary-content setting information is included in a content fragment corresponding to the content set as the primary content, wherein the primary content specifying by a service provider the certain content among the plurality of content as the primary content.

10. The broadcast receiving apparatus as claimed in claim 9, wherein an eXtensive Markup Language (XML) scheme of the content fragment includes a PrimaryContent element and a PresentationWindowIDRef element, the PrimaryContent element enabling the primary content to be identified, the PresentationWindowIDRef element being a lower element of the PrimaryContent element and representing a time period during which the certain content functions as the primary content.

11. The broadcast receiving apparatus as claimed in claim 10, wherein the service guide decomposing unit searches for a content which is available at a current time, from among contents connected with the random service by referring to the service guide, analyzes a content fragment corresponding to each available content when more than one content is available, and identifies, as the primary content, a content corresponding to a content fragment, which includes the PrimaryContent element and which includes a PresentationWindowIDRef element of the PrimaryContent element appointing a time period equal to the specific time period.

* * * * *